(12) United States Patent
Edstrom, Sr.

(10) Patent No.: US 6,488,045 B1
(45) Date of Patent: Dec. 3, 2002

(54) WATER SUPPLY MANIFOLD AND METHOD FOR ITS PRODUCTION

(75) Inventor: William E. Edstrom, Sr., Waterford, WI (US)

(73) Assignee: Edstrom Industries, Inc., Waterford, WI (US)

(*) Notice: Subject to any disclaimer, the term of this patent is extended or adjusted under 35 U.S.C. 154(b) by 0 days.

(21) Appl. No.: 10/001,675

(22) Filed: Oct. 31, 2001

Related U.S. Application Data (62) Division of application No. 09/551,634, filed on Apr. 18, 2000, now Pat. No. 6,418,961.

(51) Int. Cl.$^7$ .................................................. A01K 1/00
(52) U.S. Cl. .................. 137/259; 137/561 R; 119/475; 119/72.5
(58) Field of Search .................. 137/259, 561 R; 119/475, 72.5, 74

(56) References Cited

U.S. PATENT DOCUMENTS 2,811,982 A * 11/1957 De Young ............... 137/561 R
5,042,429 A * 8/1991 Deitrich et al. ............. 119/419
5,148,766 A * 9/1992 Coiro, Sr. et al. .......... 119/418
5,337,696 A * 8/1994 Edstrom, Sr. et al. . 119/72.5 X
5,823,144 A * 10/1998 Edstrom, Sr. et al. ...... 119/475

* cited by examiner

Primary Examiner—Kevin Lee
(74) Attorney, Agent, or Firm—Boyle Fredrickson Newholm Stein & Gratz S.C.

(57) ABSTRACT

A method of manufacturing the water supply manifold assures adequate alignment of the apertures at each water supply location by forming a single through-hole entirely through the header tube at each water supply location for the insertion of a water supply tube through the thus-formed apertures in the header tube. A preferred method includes forming a plurality of through-holes completely through a piece of a cylindrical tube stock at axially-spaced locations along the tube stock, thereby forming a header tube having at least two rows of apertures in which each aperture is aligned with another, circumferentially opposed aperture. A supply tube is inserted through a pair of circumferentially opposed apertures such that opposed ends of each supply tube protrude beyond said header tube. A fitting is mounted over each end of said supply tube.

10 Claims, 6 Drawing Sheets

WATER SUPPLY MANIFOLD AND METHOD FOR ITS PRODUCTION

CROSS-REFERENCE TO RELATED APPLICATION

This application is a divisional of and claims priority under 35 U.S.C. §120 to U.S. patent application Ser. No. 09/551,634, filed Apr. 18, 2000, U.S. Pat. No. 6,418,961 the entirety of which is incorporated by reference herein.

BACKGROUND OF THE INVENTION

1. Field of the Invention

The invention relates to water supply manifolds for supplying water to a plurality of spaced fittings and, more particularly, relates to a water supply manifold of the type typically used in a cage and rack system for housing lab animals and the like and to a method for the water supply manifold's production.

2. Discussion of the Related Art

Water supply manifolds are used in a variety of applications. One such application is a cage and rack system in which animals, such as laboratory rats or laboratory mice, are housed in a plurality of rows of cages mounted on vertically spaced shelves. Some systems have two rows of cages positioned back-to-back on each shelf. All of the cages on a particular rack may be supplied with water from a common water supply manifold and ventilated via a common air exhaust manifold and a common air supply duct. The water supply manifold of this type of system is typically serpentine in shape, consisting of several horizontal legs that are mounted on the shelves and that are linked to one another by vertical legs located at the ends of the shelves. Each horizontal section of the manifold includes a header tube and spaced fittings that extend radially from the header tube and into the associated cages. In systems in which each shelf supports two rows of cages, each header tube extends along the center of the shelf between the two rows of cages, and two circumferentially opposed fittings supply water to both cages at each water supply location on each shelf. Each animal watering valve is coupled to the manifold via a fitting arrangement including a saddle fitting that is permanently welded onto a header tube of the manifold.

Fabricating and assembling a water supply manifold usable in a cage and rack system and other, similar applications often entails a rather time consuming process. A saddle fitting must be welded onto the associated header tube at each water supply location, and a hole must then be punched through the fitting and through the wall of the header tube to produce a flow path for water through the fitting from the header tube. The welding process used to attach the saddle valve to the header tube is a rather time consuming process requiring significant skilled labor and/or complex equipment. In the case of a manifold having fittings on both sides thereof, it is also nearly impossible to perfectly align the fittings on the opposite sides of the manifold with one another. Accordingly, at each water supply location on the manifold, two holes must be punched from opposite sides of the header tube. Thus, a first hole must be punched in the header tube through a first fitting, the header tube must be rotated 180°, and a second hole must be punched in the header tube through the second fitting. Only then can the header tube be indexed to position the next fitting receiving location in the punching location.

The punching process also tends to distort the header tube to separate the header tube wall from the saddle weld connecting the fitting to the header tube, thereby forming a "dead space" between the weld and the header tube in which water may accumulate and foster bacterial growth. This bacterial growth may endanger the health of animals supplied with drinking water.

The need therefore has arisen to provide a water supply manifold that can be produced easily and quickly while at the same time ensuring adequate seals between the manifold's header tube and the associated fitting. The need has also arisen to provide a method for rapidly producing tubular water supply manifolds that results in an improved end product.

SUMMARY OF THE INVENTION

In accordance with a first aspect of the invention, an improved water supply manifold is provided that lacks traditional welded saddle fittings. The water supply manifold instead includes a cylindrical header tube having a number of spaced apertures, each of which is surrounded by an at least generally planar depressed surface portion or "flat." It further includes a plurality of fittings, each of which has an inlet which is in fluid communication with an associated one of the apertures and an axial upstream end surface which is disposed outside of the header tube and which is sealed against the flat adjacent to the associated aperture. This relationship negates the need for an additional saddle weld and eliminates any dead spaces at the juncture between the header tube and the fitting in which water could otherwise accumulate and foster bacterial growth.

In order to negate the need for any weld and to further facilitate assembly, the fitting preferably is threaded onto or otherwise attached to a supply tube that extends through the associated aperture so as to have an inlet opening disposed within the header tube and an outlet opening that empties into the fitting. If the water supply manifold is of the type in which two opposed fittings are located at each water supply location along the manifold, the supply tube preferably extends completely through the header tube such that opposed outlet ends of the supply tube extend from two circumferentially opposed radially aligned apertures in the header tube. This arrangement negates the need for a separate supply tube for each fitting, thereby considerably reducing the number of parts and accelerating assembly. It also negates the need to attach the support tube to the header tube.

A single supply tube can be employed at each water supply location of a two row system only if the apertures in the opposite sides of the header tube are perfectly or nearly perfectly aligned with one another. In accordance with another aspect of the invention, a method of manufacturing the water supply manifold assures adequate alignment of the apertures at each water supply location by forming a single through-hole entirely through the header tube at each water supply location for the insertion of a water supply tube through the thus-formed apertures in the header tube. In order to obtain the benefit of a dead space-free seal between the fitting and the header tube, the hole forming step also is preferably accompanied by a collapsing step that forms the above-described flat around the apertures in the header tube. Both steps can be performed via a fully automated hole piercing process that automatically pierces the through hole and that forms the opposed flats.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

1. Resume

Pursuant to the invention, a water supply manifold can be manufactured easily and inexpensively while simultaneously providing an improved connection of the manifold components to one another. The water supply manifold, or at least each section thereof, includes (1) a header tube that is configured to extend longitudinally along a support surface such as a shelf and (2) fittings that are mounted on the header tube in a spaced-apart relationship relative to one another. In a preferred embodiment in which the water supply manifold is intended for use in an animal water supply system, two opposed fittings may be provided on opposite sides of the header tube at each water supply location so as to permit two rows of cages to be mounted back-to-back on each shelf of a cage and rack system. In this case, a single supply tube may extend completely through the header tube at each water supply location and receive a respective fitting at each of two outlet ends thereof. The header tube is recessed to form a flat adjacent each aperture in the header tube so as to permit the axial end of each fitting to be pressed against the flat in order to provide an improved seal and to prevent the formation of dead spaces in which water would otherwise accumulate. The header tube for the water supply manifold can be formed from tube stock in an automated hole-piercing process using a hole-piercing machine that automatically forms the flats while piercing a hole completely through the tube stock.

2. System Overview

Figure 1:
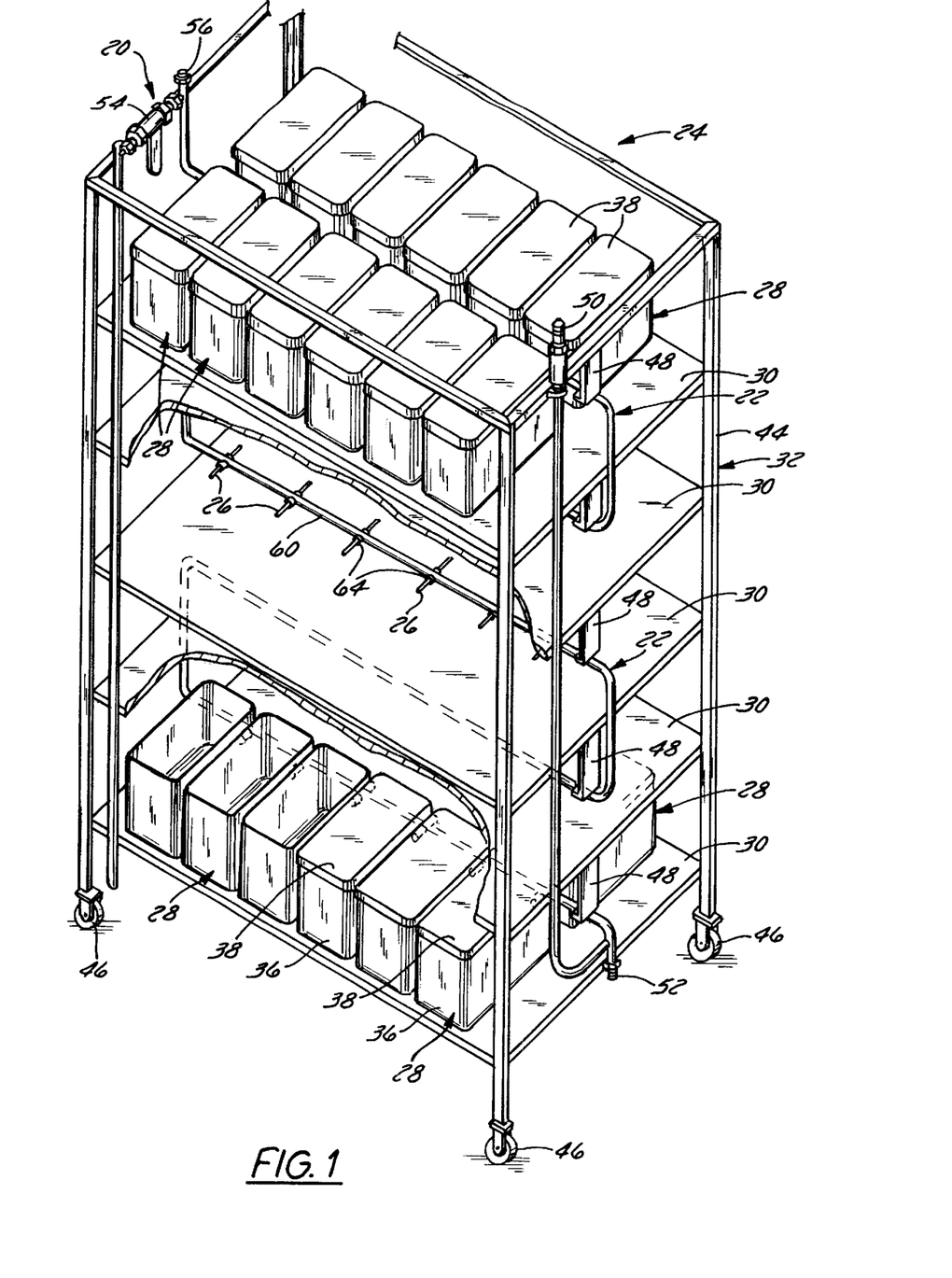
FIG. 1 is a partially cut away perspective view of a cage and rack system incorporating a water supply manifold constructed in accordance with a preferred embodiment of the present invention.
Figure 2:
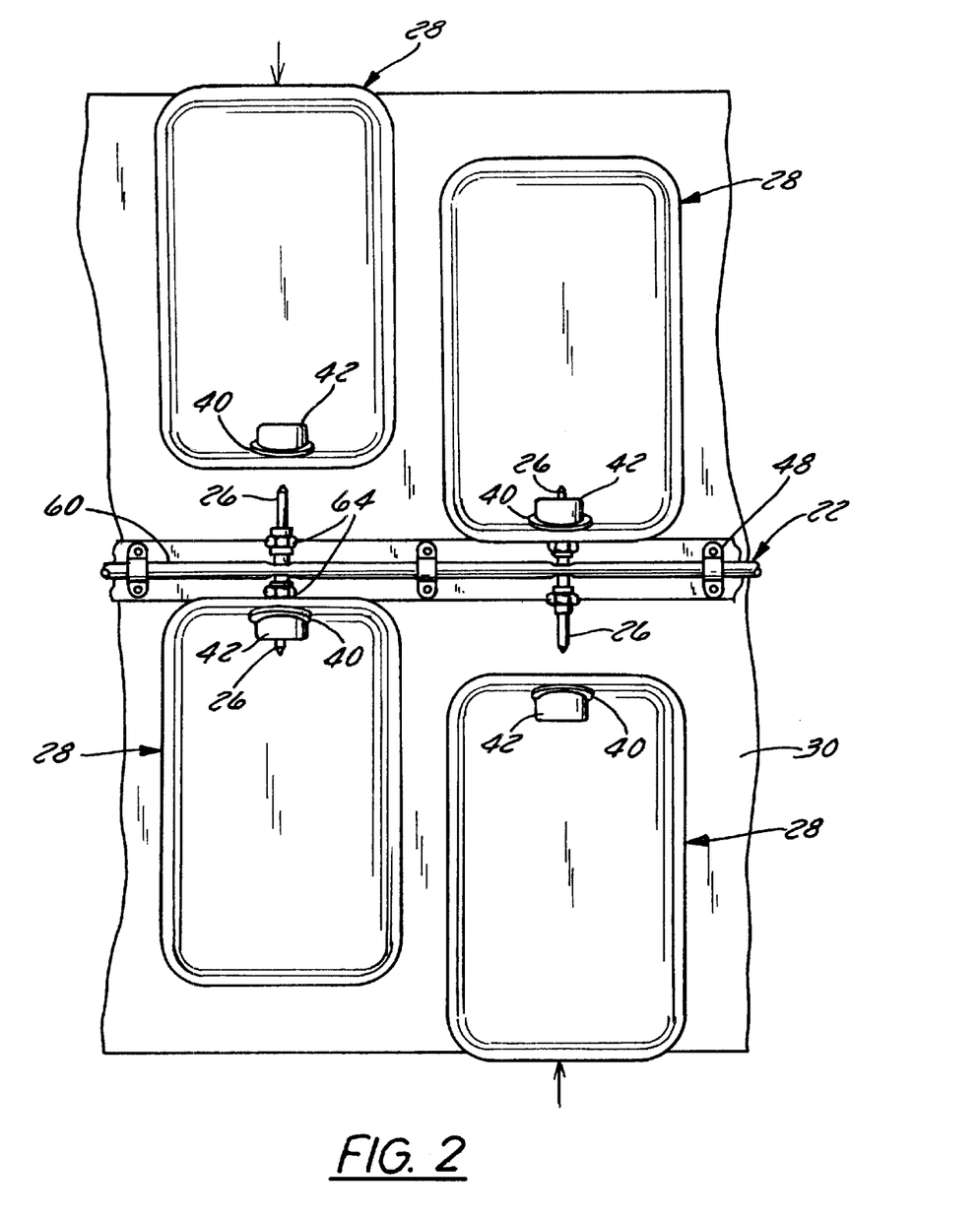
FIG. 2 is a top plan view of a portion of a cage and rack system of FIG. 1.

The inventive water Supply manifold 22 is usable in a variety of applications. Referring to FIGS. 1 and 2 of the drawings, one such application is an animal watering system 20 that is configured for use in a cage and rack system 24. Specifically, in this example, the water supply manifold 22 is configured to supply drinking water through animal watering valves 26 to animals housed in rows of cages 28 supported on vertically spaced shelves 30 of a rack 32 of the system 24.

Each of the cages 28 may take the form of any conventional cage suitable for housing an animal and for selective removal from and replacement on the system 24. In the illustrated embodiment, each cage 28 includes an enclosed base 36 capped with a filter bonnet 38 having an internal filter for preventing the transfer of air from one cage to another. The base 36 of each cage 28 has an opening 40 formed therein for accommodating an associated watering valve 26. In the illustrated embodiment, this opening 40 receives a grommet 42 having a central aperture formed therein which receives the watering valve 26.

The rack 32 is conventional. It includes shelves 30 mounted one above the other on a frame 44 which, in turn, is supported on wheels or casters 46. The water supply manifold 22 is connected to the shelves 30 by suitable brackets 48. In the illustrated embodiment, the manifold 22 is a so-called reverse "s" or reverse serpentine manifold which extends back and forth across the rack 32 along the shelves 30 from the lowermost to the uppermost shelf. Each section of the manifold 22 is located near the center of the respective shelf 30 so that cages 28 may be positioned on both sides of the manifold 22 in a back-to-back relationship. Manifold 22 additionally includes a water inlet 50 coupled to the bottom of the manifold 22, a normally closed drain 52, a ball valve 54 coupled to the drain 52, and an air vent 56.

In use, the water supply manifold 22 is filled from the bottom up, forcing air up through the manifold and out of the vent 56, thereby preventing air from being trapped in the manifold 22. The ball valve 54 may be used to periodically flush the manifold 22, in which case water flowing out of the ball valve 54 will be directed below the rack 32 by drain 52 to prevent the cages 28 from getting wet during flushing. Of course, the rack 32 and manifold 22 could be replaced with water bottles or any suitable devices capable of supporting one or more cages and of supplying water to such cages.

3. Construction of Water Supply Manifold

Referring to FIGS. 3–6, the water supply manifold 22 includes several horizontal manifold sections connected to one another by vertical sections so as to produce the above-described serpentine configuration. Each manifold section comprises a cylindrical header tube 60, a plurality of supply tubes 62, and a plurality of fittings 64. The fittings 64 are provided in two parallel, diametrically opposed rows such that, at each water supply location along a manifold section, a pair of fittings 64 extends horizontally into contact with opposite sides of the header tube 60. This relationship permits cages 28 to be positioned on either side of the manifold 22 in a back-to-back relationship as described above. If the cage and rack system 24 is designed to fit along a wall or another structure so that cages 28 are not positioned back-to-back, then only a single row of fittings 64 would be provided, and the water supply manifold 22 would be positioned adjacent to the front edges of the shelves 30.

Figure 4:
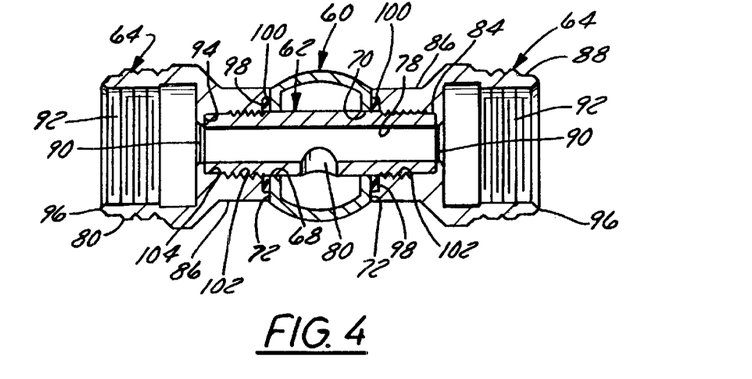
FIGS. 4 and 5 are side sectional elevation and top plan sectional views, respectively, of a portion of the water supply manifold, taken at a water supply location on the water supply manifold.
Figure 5:
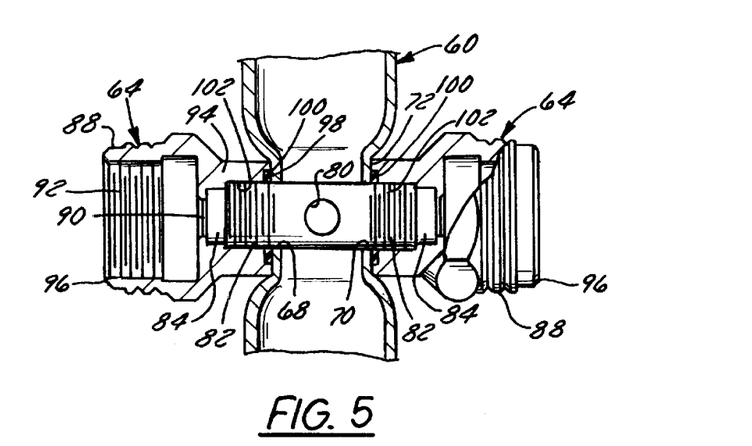
Figure 6:
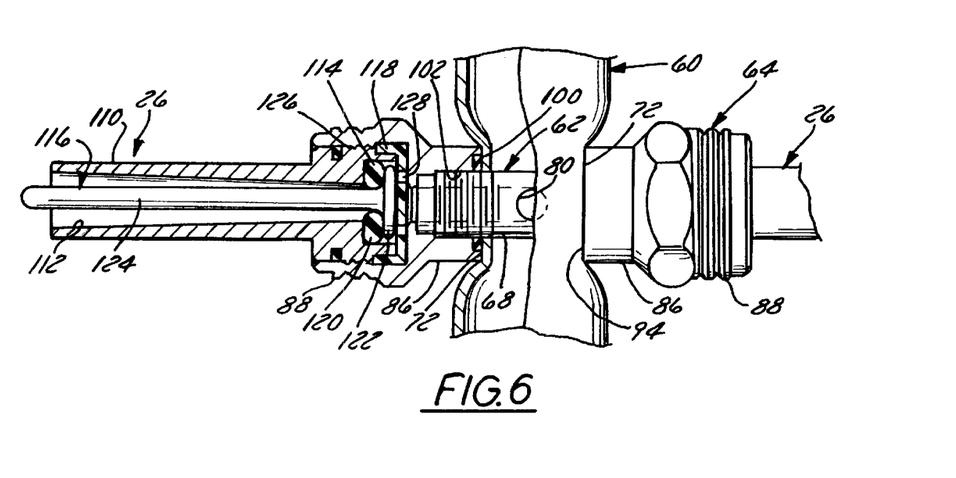
FIG. 6 is a partially cut away plan view illustrating the portion of the water supply manifold seen in FIGS. 4 and 5 and also illustrating the connection of an animal watering valve to a fitting on the manifold.

The header tube 60 of each manifold section comprises a metal, preferably stainless steel, hollow cylindrical structure. Apertures 68 and 70 extend in two horizontal rows which lie in a common horizontal plane on opposite sides of the header tube 60. The apertures are spaced such that two aligned apertures 68 and 70 are formed in opposite sides of the header tube 60 at each water supply location to accommodate passage of a single horizontal supply tube 62 completely through the header tube 60 as seen in FIGS. 4–6. Each aperture 68 and 70 is surrounded by a recessed saddle portion that presents an at least substantially planar depressed portion or "flat" 72 on the outer periphery of the header tube 60. Each flat 72 provides a mating surface for an axial end surface of an associated saddle fitting 64 as discussed below.

Figure 3:
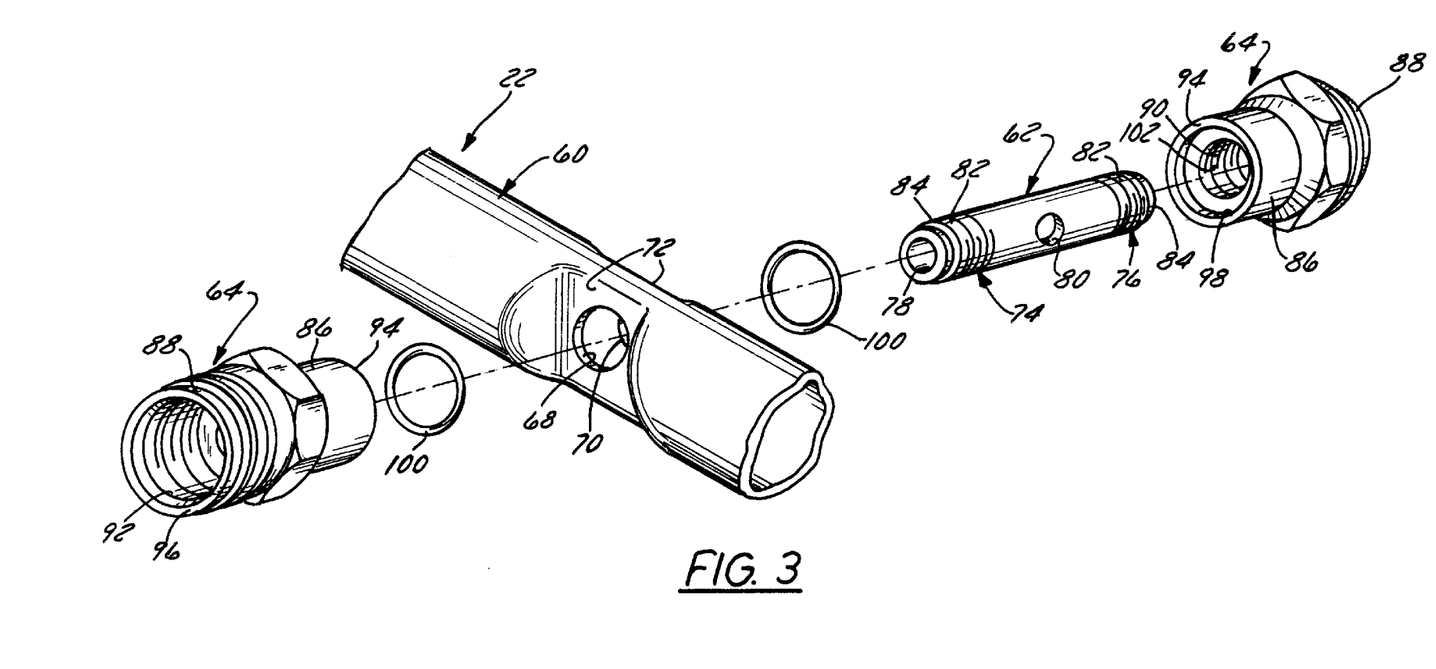
FIG. 3 is an exploded perspective view of a portion of the water supply manifold of the cage and rack system.

Each supply tube 62 comprises a hollow cylindrical tube having a pair of outlet ends 74 and 76 that protrude beyond the header tube 60. A first bore 78 extends axially through the supply tube 62 to form axial water outlets at each axial end. A second, radial bore 80, positioned approximately axially centrally along the supply tube 62, opens into the first bore 78 to serve as a water inlet for the supply tube 62. Both of the outlet ends 74 and 76 have an upstream externally threaded portion 82 and a downstream portion 84 of a reduced diameter when compared to the diameter of the adjacent externally threaded portion 82 so as to mate with a corresponding surface of the associated saddle fitting 64.

Each of the saddle fittings 64 includes a body having an axial through bore. The bore is stepped so as to present inlet and outlet portions 86 and 88. The inlet portion 86 is mounted over the associated outlet end 74 or 76 of the supply tube 62 to present an inlet 90 between an upstream end face 94 of the saddle fittings 64 and the outlet portion 88 of the bore. The inner axial end face 94 of the fitting 64 has a counter-bored groove 98 formed therein which surrounds inlet portion 86 of the bore and which is configured to receive an elastomeric ring seal 100. The inlet portion 86 of the bore has a threaded upstream portion 102 and a smooth downstream portion 104 of a slightly smaller diameter than the upstream portion 102. The downstream portion 104 is configured to provide a metal-to-metal face seal with the downstream-most portion 84 of the supply tube 62 when the saddle fitting 64 is screwed onto the supply tube 62. The threaded upstream portion 102 is configured to screw onto the threaded portion 82 of a corresponding outlet end 74 or 76 of an associated supply tube 62. The upstream portion 102 of the bore inlet portion 86 is also internally threaded for connection to an animal watering valve 26. The outlet portion 88 of the bore is internally threaded and terminates in an outlet 92 of the fittings 64 at its downstream end.

The animal watering valve 26 may comprise any animal-actuated valve suitable for supplying drinking water to an animal upon demand. Referring to FIG. 6, a suitable watering valve 26 includes a body 110 having an axial through bore 112 which widens into a valve chamber 114 near its front or upstream axial end. Disposed within the valve body 110 are a stem 116, a diaphragm 118, and an elastomeric ring 120. The stem 116 includes (1) a head 122 that is positioned in the valve chamber 114 between the ring 120 and the diaphragm 118 and (2) a tail 124 that extends axially through the bore 112 from the head 122. An upstream end 126 of the body 110 is externally threaded so as to be capable of being screwed into the internally threaded outlet portion 88 of the associated saddle fitting 64.

The ring 120 biases the head 122 toward the illustrated position in which a front axially face on the head 122 rests against a rear-face of diaphragm 118 to seal apertures 128 in the diaphragm 118. When an animal deflects the tail 124 radially using its snout, the head 122 rocks about the ring 120 to provide an opening between the head 122 and the diaphragm 118 for the flow of water through the apertures 128 in the diaphragm 118 and thence through the watering valve 26.

Unlike prior manifold connections that require complex welding operations, the saddle fittings 64 can be mounted on the supply tubes 62 in a remarkably simple manner using nothing more than common tools. Specifically, a supply tube 62 can be inserted through each pair of aligned apertures 68 and 70 in the header tube 60 so that both outlet ends 74 and 76 of the supply tube 62 protrude beyond the respective side of the header tube 60 and so that the inlet orifice 80 is substantially centrally located within the header tube 60. Then, the seal ring 100 is mounted in the counterbored groove 98 in the end face 94 of the saddle fitting 64, and the saddle fitting 64 is simply screwed onto the associated outlet end 74 or 76 of the supply tube 62. This operation also clamps the supply tube 62 in place, negating the need for a separate connector for attaching the supply tube 62 to the header tube 60.

The saddle fittings 64 and supply tubes 62 are dimensioned relative to one another so as to provide two seals upon assembly that eliminate any dead spaces in which water may accumulate. Specifically, as each saddle fitting 64 is threaded onto the associated outlet end 74 or 76 of the corresponding supply tube 62, the above-mentioned face seal forms a first seal point located at the outlet end 74 or 76 of the supply tube 62. Then, at the end of the threading process, the upstream axial end face 94 of the saddle fitting 64 presses up against the flat 72 adjacent the associated aperture 68 and 70 to compress the seal ring 100 and form a second seal. As a result, the sole flow path for water entering the supply tube 62 is into and through the saddle fitting 64. There are no dead spaces in the fluid flow path for water to accumulate.

4. Fabrication of Header Tube

As should be apparent from Section 2 above, a header tube 60 usable in the above-described water supply manifold 22 exhibits at least two rather distinctive characteristics at each water supply location. First, it has two opposed apertures 68 and 70 that are aligned with one another. This alignment is necessary if a single supply tube 62 is to be used to supply water to two aligned saddle fittings 64. Otherwise, the supply tube 62 could not be inserted completely through the header tube 60. Second, a recessed flat 72 surrounds each aperture 68 or 70 for mating with the seal ring 100 and axial end face 94 on the associated saddle fitting 64. These structures can be formed from a standard tube stock in an automated production process using a known CNC hole piercing machine modified to include clamps that form the flats 72 on the header tube 62.

Figure 7:
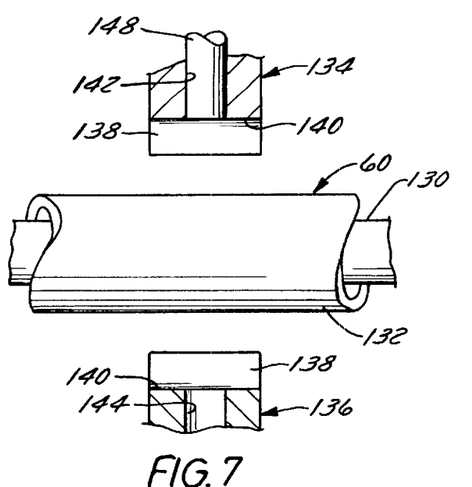
FIGS. 7 through 10 are sectional views illustrating the sequence of forming a section of a header tube of the water supply manifold using an automated hole-piercing machine.
Figure 8:
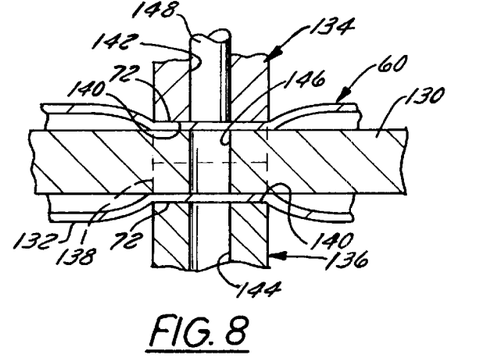
Figure 9:
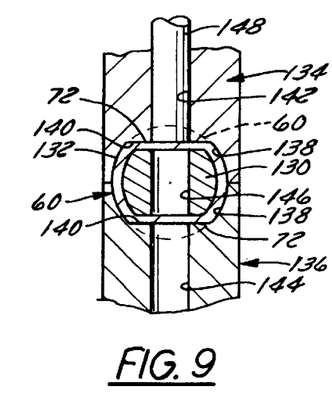
Figure 10:
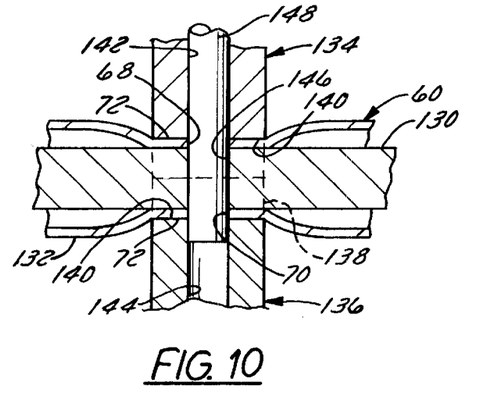
Figure 11:
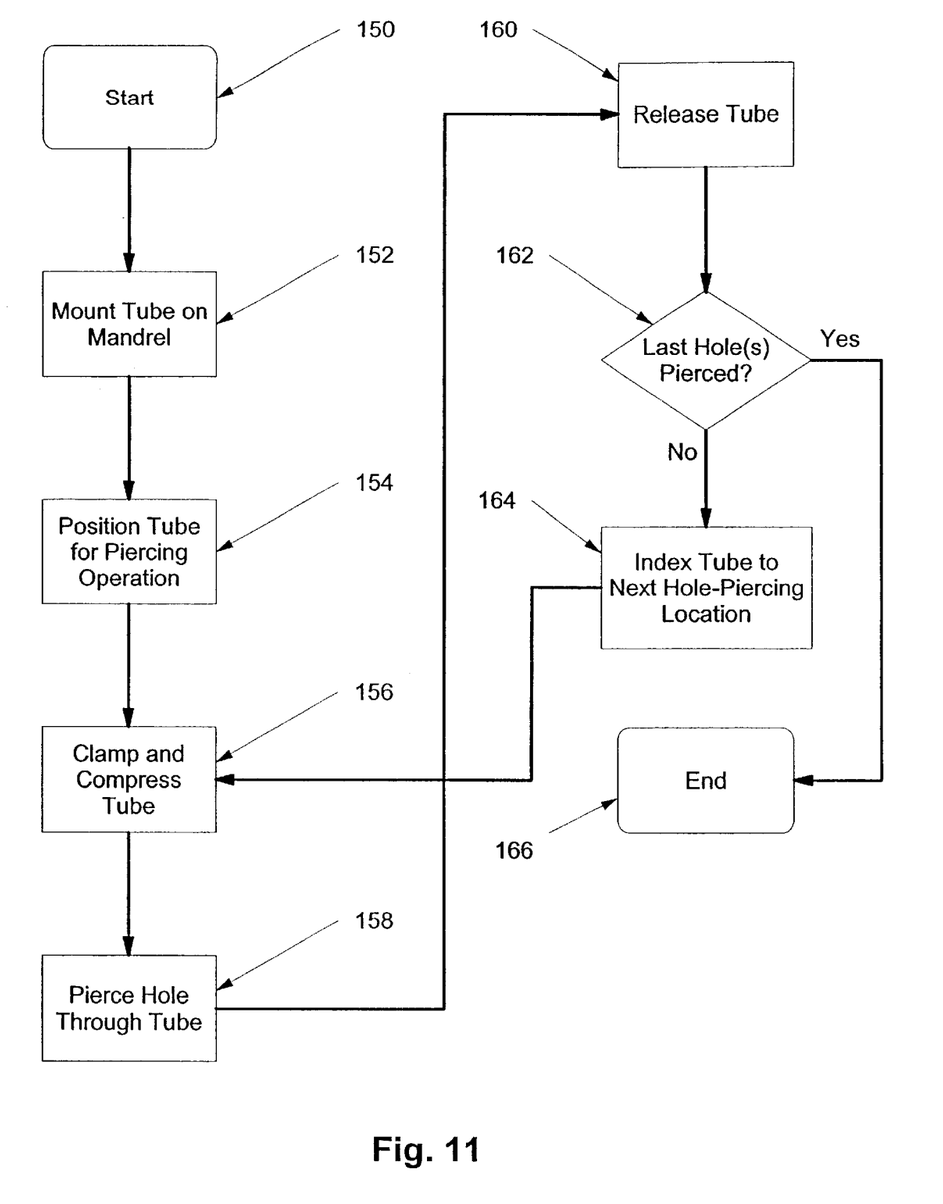
FIG. 11 is a flow chart of a hole piercing process performable using the hole-piercing machine.

Referring to FIGS. 7–10, one such machine includes a mandrel 130 that extends through at least one, and possible two or more hole piercing stations of the machine. The mandrel 130 is sized so as to receive a piece of tube stock 132 having an inner diameter larger than the diameter the mandrel 130. As best seen in FIGS. 7 and 8, the surface of the mandrel 130 is flattened at its upper and lower portions in the hole piercing station(s).

Each hole piercing station of the machine includes upper and lower clamps 134 and 136 located on opposite sides of the mandrel 130. Each of the clamps has a C-shaped recess formed in its outer end that is bounded at both sides thereof by a curved vertical wall 138 and at the inner end thereof by a horizontal wall 140. The upper clamp 134 has a bore 142 formed vertically therethrough. The lower clamp 136 has a bore 144, or at least a recess, formed in its upper end in alignment with the bore 142 in the upper clamp 134. A through hole 146 is formed radially through the mandrel in alignment with the bores 142 and 144 in the upper and lower clamps 134 and 136. A hole piercing punch 148 is reciprocal within the bore 142 of the upper clamp 134 (1) from the position illustrated in FIG. 7 in which it is positioned above the recess in the upper clamp 134 (2) to the position illustrated in FIG. 10 in which it extends completely through the tube stock 132 and the mandrel 130 and into the bore 144 of the lower clamp 136.

Collets (not shown) are movable along the mandrel 130 from a position remote from the hole piercing station(s) to a location in the vicinity of the hole piercing station(s). The collets are operable, under control of the CNC machine's computer program, to position the tube stock 132 in the appropriate location for a hole piercing operation and to then index the tube stock 132 along the mandrel 130 between hole piercing operations.

Referring to FIGS. 7–10 and to the flowchart of FIG. 1 which begins with START at Step 150, a machine operator prepares the machine for a hole piercing operation by mounting a piece of cylindrical tube stock 132 over the mandrel 130 and engaging the end of the tube stock 132 with the collets in Step 152. If the tube stock 132 is not accurately positioned for the first hole piercing operation, the machine then indexes the tube stock 132 to that location in Step 154. Then, in Step 156, the machine automatically actuates the clamps 134 and 136 to move toward one another from the positions illustrated in FIG. 7 to the position illustrated in FIGS. 8 and 9. During this process, the clamps 134 and 136 engage the tube stock 132 and collapse it against the flat surfaces of the mandrel 130 to form the above-described flats 72. Then, in Step 158, the machine drives the hole piercing punch 148 from the position illustrated in FIG. 8 and 9 to the position illustrated in FIG. 10 to punch a hole completely through the tube stock 132. This operation forms the above described perfectly aligned apertures 68 and 70 on opposite sides of the tube stock 132. Because the tube stock 132 is held in place against the mandrel 130 by the clamps 134 and 136 at this time, the punching operation occurs without any distortion of the tube stock 132 in the vicinity of the apertures 68 and 70, and the locations of the apertures can be assured with great precision. The clamps 134 and 136 and hole piercing punch 148 are then withdrawn in Step 160 to release the tube stock 132, and the machine then axially indexes the tube stock 132 so that the next water supply location on the tube stock is positioned in the hole-piercing station in Step 164. Steps 156 to 164 are then repeated as necessary until apertures 68 and 70 and flats 72 are formed at all water supply locations along the tube stock 132, at which point the process proceeds from an inquiry step 162 to END in Step 166.

The above described hole-piercing process and associated fitting assembly process can be performed much more rapidly than any prior known water supply manifold fabrication assembly process. Indeed, the fully automated hole piercing process described above is capable of forming 240 header tube sections per hour having seven through holes per header tube section using a machine that has a single hole-piercing station. The remaining assembly steps also can be performed very rapidly because they do not require any complex welding operations. As a result, the total production time for the water supply manifold 22 is reduced dramatically when compared to those required for a traditional water supply manifold. Quality and safety also are enhanced.

Many changes of modifications may be made within the scope of the invention without departed from the spirit thereof. The scope of some of these changes are discussed above. The scope of other changes will become apparent from the appended claims.

I claim:

1. A method of forming a water supply manifold, comprising:
   (A) forming a plurality of through-holes completely through a piece of a cylindrical tube stock at axially-spaced locations along said tube stock, thereby forming a header tube having at least two rows of apertures in which each aperture is aligned with another, circumferentially opposed aperture;
   (B) inserting a supply tube through a pair of circumferentially opposed apertures such that opposed ends of each supply tube protrude beyond said header tube; and
   (C) mounting a fitting over a distal each end of said supply tube, each said fitting being dimensioned and configured for connection to an animal watering valve.

2. A method of forming a water supply manifold, comprising:
   (A) forming a plurality of through-holes completely through a piece of a cylindrical tube stock at axially-spaced locations along said tube stock, thereby forming a header tube having at least two rows of apertures in which each aperture is aligned with another, circumferentially opposed aperture;
   (B) inserting a supply tube through a pair of circumferentially opposed apertures such that opposed ends of each supply tube protrude beyond said header tube;
   (C) mounting a fitting over each end of said supply tube; and
   (D) collapsing said header tube at locations adjacent to said apertures to form an at least substantially planar depressed surface portion adjacent each of said apertures.

3. A method as recited in claim 2, further comprising sealing an axial end of said fitting against the depressed surface portion located adjacent the associated aperture.

4. A method as recited in claim 2, wherein, at each axial location along said header tube bearing said apertures, said hole forming and collapsing steps are performed via a combined punching and pinching operation performed via a hole piercing machine.

5. A method as recited in claim 4, wherein said hole piercing machine (1) clamps said tube stock from opposite sides to form said depressed surface portions and (2) while said header tube is held between said clamps, punches a hole completely through said tube stock using a piercing punch of said hole piercing machine.

6. A method as recited in claim 5, wherein said hole piercing machine comprises a mandrel on which said tube stock is supported, said mandrel having a hole therethrough which is aligned with said piercing punch.

7. A method as recited in claim 5, further comprising, after the punching step, unclamping said tube stock, indexing said tube stock to the next hole piercing position, and operating said hole piercing machine to punch and collapse another section of said tube stock.

8. A method of forming a water supply manifold comprising:
   (A) punching a plurality of through-holes at least substantially radially through a piece of a cylindrical tube stock at axially-spaced locations along said tube stock, thereby forming a header tube having at least two rows of apertures in which each aperture is aligned with another, circumferentially opposed aperture, said punching step comprising, (1) positioning a first portion of said tube stock at a hole piercing station of a hole-piercing machine,
(2) clamping said first portion of said tube stock from opposite sides with sufficient pressure to partially collapse said tube stock to form at least substantially planar depressed surface portions on opposite sides of said tube stock,
(3) while said tube stock is held between said clamps, punching a hole completely through said first portion of said tube stock using a piercing punch of said hole piercing machine,
(4) unclamping said tube stock,
(5) indexing said tube stock so that a second portion of said tube stock is located at said hole piercing station, and
(6) repeating steps (2) through (5) at each of a plurality of axially-spaced locations along said tube stock, thereby forming said header tube;

(B) inserting each of a plurality of supply tubes through a corresponding pair of circumferentially opposed apertures such that opposed ends of each supply tube protrude beyond said header tube; and (C) threading a fitting onto each end of each of said supply tubes.

9. A method as recited in claim 8, further comprising sealing an axial end of each of said fittings against the depressed surface portion located adjacent the associated aperture.

10. A method as recited in claim 8, wherein said hole piercing machine comprises a mandrel on which said header tube is supported, said mandrel having a hole therethrough which is aligned with said piercing punch.

* * * * *